US005727836A

United States Patent [19]
Hosoya

[11] Patent Number: 5,727,836
[45] Date of Patent: Mar. 17, 1998

[54] TONNEAU COVER DEVICE FOR MOTOR VEHICLES

[75] Inventor: Shizuo Hosoya, Wako, Japan

[73] Assignee: Honda Giken Kogyo Kabushiki Kaisha, Tokyo, Japan

[21] Appl. No.: 722,932

[22] Filed: Sep. 30, 1996

[30] Foreign Application Priority Data

Oct. 18, 1995 [JP] Japan ................... 7-270321

[51] Int. Cl.⁶ ............................................. B60R 5/04
[52] U.S. Cl. ................................. 296/37.16; 296/37.1
[58] Field of Search ........................ 296/37.1, 37.16, 296/98; 160/24, 274, 275, 276, 280, 281

[56] References Cited

U.S. PATENT DOCUMENTS

| | | | |
|---|---|---|---|
| 548,485 | 10/1895 | Walter | 160/275 |
| 4,127,301 | 11/1978 | Syrowik | 296/37.16 |
| 4,148,516 | 4/1979 | Gotomyo | 296/37.1 |
| 4,168,094 | 9/1979 | Yagi | 296/37.16 |
| 4,220,367 | 9/1980 | Gale et al. | 296/37.16 |
| 4,222,600 | 9/1980 | Cripps et al. | 296/37.1 |
| 4,289,345 | 9/1981 | Tamamushi et al. | 296/37.16 |
| 4,351,555 | 9/1982 | Hashimoto | 296/37.16 |
| 4,502,674 | 3/1985 | White et al. | 296/37.16 |
| 4,536,025 | 8/1985 | Yamawaki et al. | 296/37.16 |
| 4,648,648 | 3/1987 | Shigesada et al. | 296/37.16 |
| 4,776,625 | 10/1988 | Lobanoff et al. | 296/37.16 |
| 5,238,284 | 8/1993 | Whitaker | 296/37.16 |

FOREIGN PATENT DOCUMENTS 59-92228  5/1984  Japan ......................... 296/37.1

Primary Examiner—Joseph D. Pape
Attorney, Agent, or Firm—Armstrong, Westerman, Hattori, McLeland & Naughton

[57] ABSTRACT

A tonneau cover device has a lock assembly mounted on a cover for locking the cover in a desired position between a casing and a tailgate. The lock assembly includes a pair of hook mechanisms each comprising a fixed hook member fixedly mounted on the cover and a movable hook member angularly movably mounted on the fixed hook member for angular movement through a predetermined angle against the bias of a spring acting between the fixed and movable hook members.

10 Claims, 11 Drawing Sheets

TONNEAU COVER DEVICE FOR MOTOR VEHICLES

BACKGROUND OF THE INVENTION

1. Field of the Invention

The present invention relates to a tonneau cover device for covering a compartment between the passenger's seats in a motor vehicle and the tailgate thereof.

2. Description of the Related Art

Some automobiles such as station wagons employ a tonneau cover for covering a compartment, hereinafter referred to as a cargo room, between the rear passenger's seats and the tailgate of the automobile.

Conventional tonneau covers usually comprise a casing fixed to the rear passenger's seats, and a cover which is normally wound in the casing and can be extended to cover the cargo room in its entirety. The cover can be pulled out of the casing toward the tailgate and locked on the tailgate to cover a cargo in the cargo room primarily for privacy protection.

Figure 9:
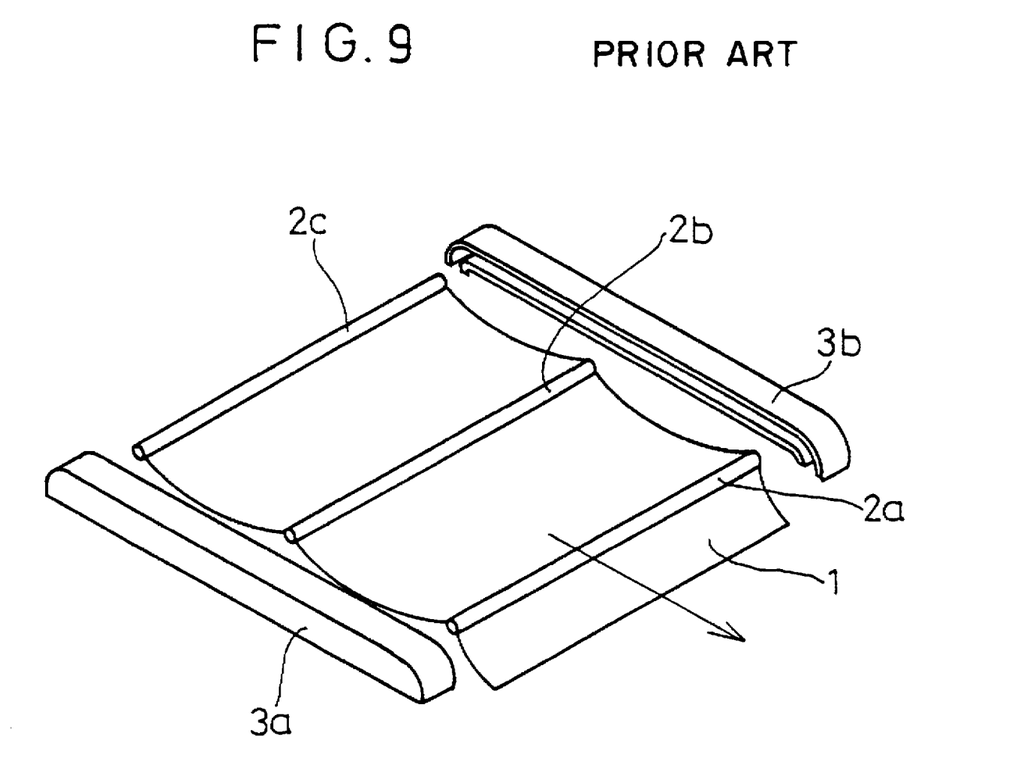
FIG. 9 is an exploded perspective view of a conventional tonneau cover device.
Figure 10:
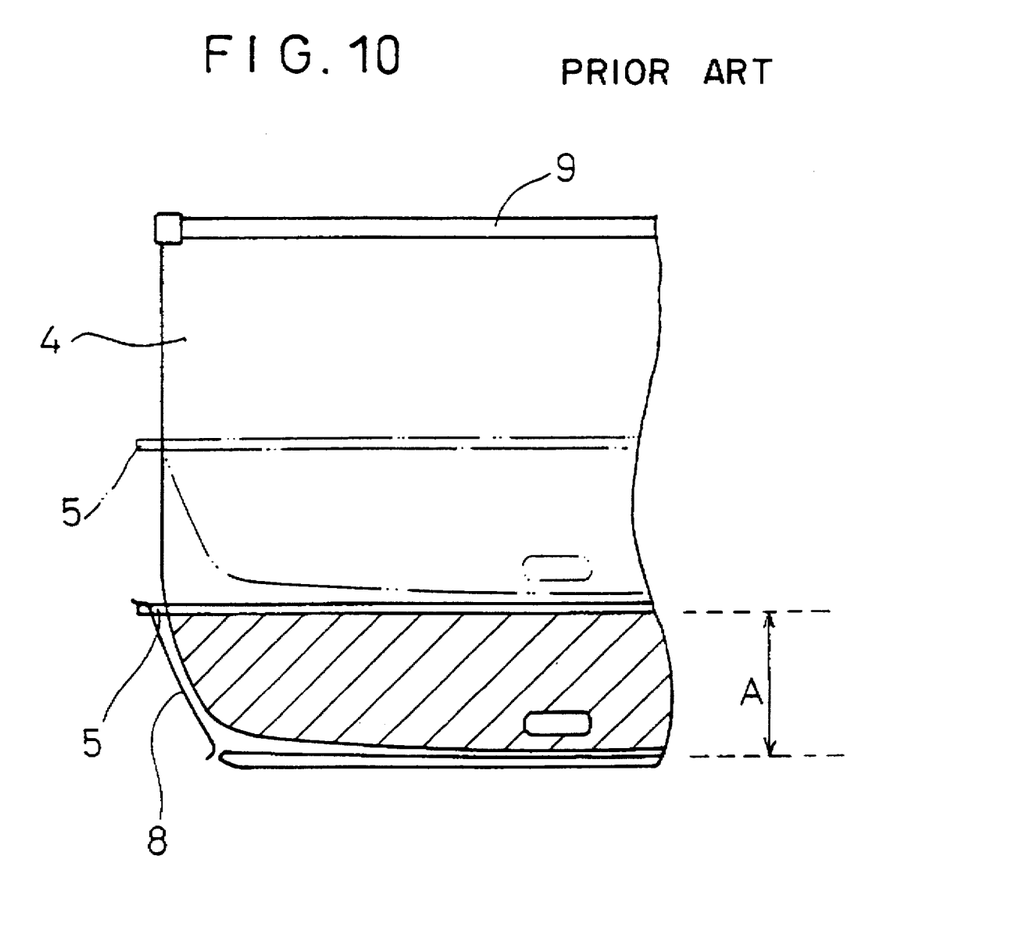
FIG. 10 is a fragmentary plan view of another conventional tonneau cover.

Known tonneau covers are classified into three major types. According to the first group, the cover is usually completely stored in the casing and can be pulled out of the casing. FIG. 9 of the accompanying drawings illustrates a tonneau cover device of the second kind. As shown in FIG. 9, the tonneau cover device has a plurality of pipes 2a, 2b, 2c spaced from each other and extending perpendicularly to the direction indicated by the arrow in which a cover 1 is pulled, and a pair of rails 3a, 3b which engage the opposite ends of the pipes 2a, 2b, 2c to keep the cover 1 locked in any desired position along the rails 3a, 3b. According to the third type which is shown in FIG. 10 of the accompanying drawings, a pin 5 is transversely supported on a cover 4 and has opposite ends projecting from lateral edges of the cover 4. When the cover 4 is pulled out of a casing 9, the cover 4 can adjustably cover the cargo room, and the opposite ends of the pin 5 can engage cargo room walls, holding the cover 4 stretched over the cargo room.

Figure 11:
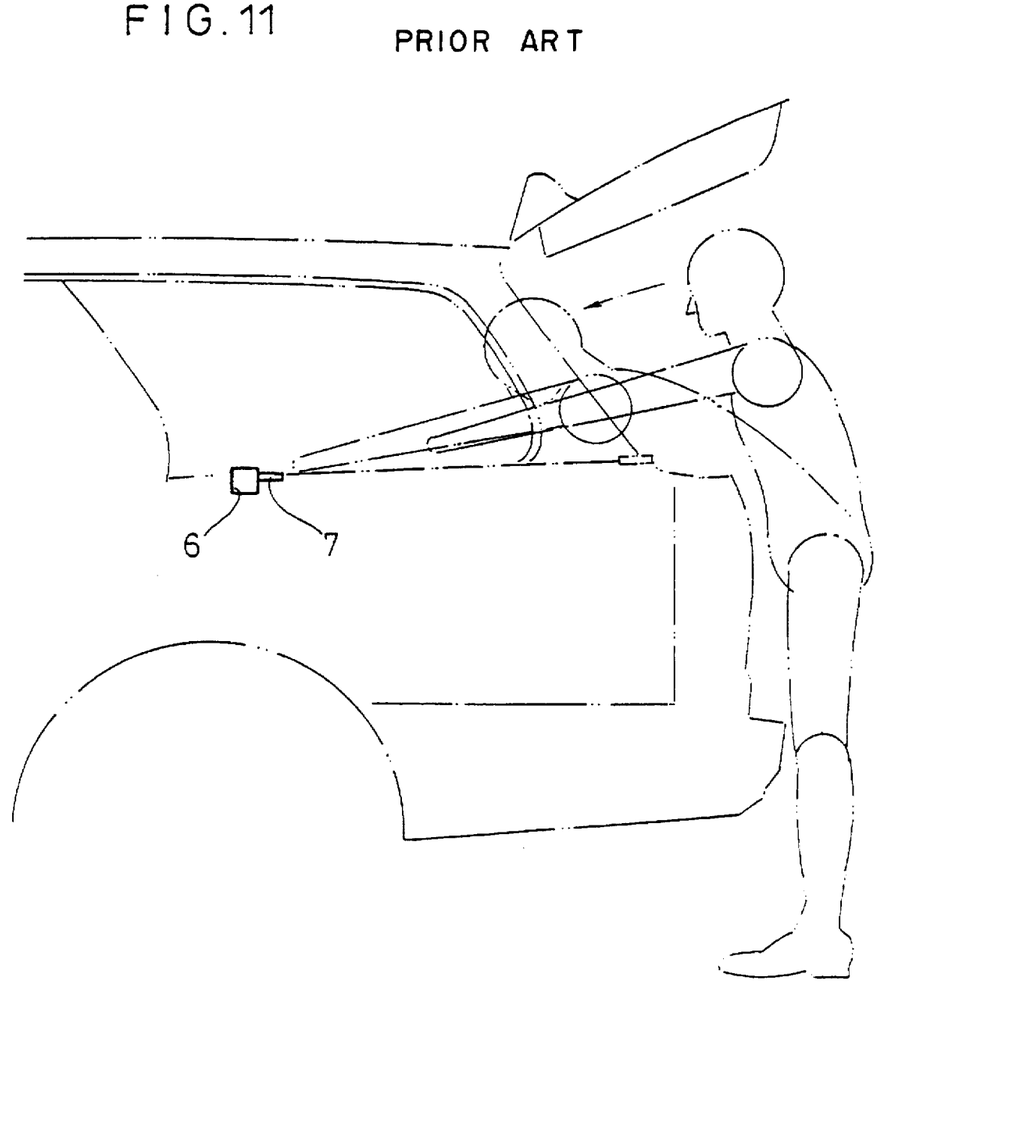
FIG. 11 is a schematic side elevational view showing the manner in which still another conventional tonneau cover is operated by the user who is standing behind the tailgate of a motor vehicle.

With the tonneau cover of the first category, as shown in FIG. 11 of the accompanying drawings, when the user who is standing behind the motor vehicle is to pull a cover 7 out of a casing 6, the user has to bend his upper body into the cargo room to reach the casing 6. This process is cumbersome and fatiguing to the user.

The tonneau cover device of the second kind shown in FIG. 9 is complex in structure, made up of a large number of parts, and expensive to manufacture.

The tonneau cover structure of the third type shown in FIG. 10 suffers the following drawbacks: Since the rear portion of the cargo room is progressively narrower toward the tailgate because of inwardly curved rear pillar linings, e.g., D pillar linings, 8, the pin 5 cannot be positioned in the narrow rear portion of the cargo room. Therefore, the distance A from the pin 5 to the rear end of the cover 4 is relatively large, and hence the rear end portion, shown hatched, of the cover 4 is also relatively large. Since the rear end portion of the cover 4 is not supported and hence is unstable, it tends to wobble and produce noise both when the cover 4 is pulled out and when it is retracted into the casing 9.

SUMMARY OF THE INVENTION

It is a general object of the present invention to provide a tonneau cover device for use in a motor vehicle, which is of a relatively simple structure, can be manufactured inexpensively, and allows a cover to be pulled with ease.

A principal object of the present invention is to provide a tonneau cover device for use in a motor vehicle, which can hold a portion of a cover that is not stored in a casing, against wobbling and the production of noise.

According to the present invention, a cover drawn from a casing by the user can be locked in an intermediate position between the casing and the tailgate of a motor vehicle by a pair of hook mechanisms comprising respective movable hook members rotatably mounted on respective fixed hook members mounted on the cover. When the cover is further drawn from the casing by the user, the movable hook members are angularly moved with respect to the fixed hook members by sliding engagement with respective curved walls of retainer mechanisms until the cover is locked in a rear end position near the tailgate by the fixed hook members that are engaged by respective hook-shaped teeth of the retainer mechanisms.

The cover can thus be locked selectively in different positions by the hook mechanisms and the retainer mechanisms which are relatively simple in structure.

The above and other objects, features, and advantages of the present invention will become apparent from the following description when taken in conjunction with the accompanying drawings in which a preferred embodiment of the present invention is shown by way of example.

DETAILED DESCRIPTION OF THE PREFERRED EMBODIMENT

Figure 1:
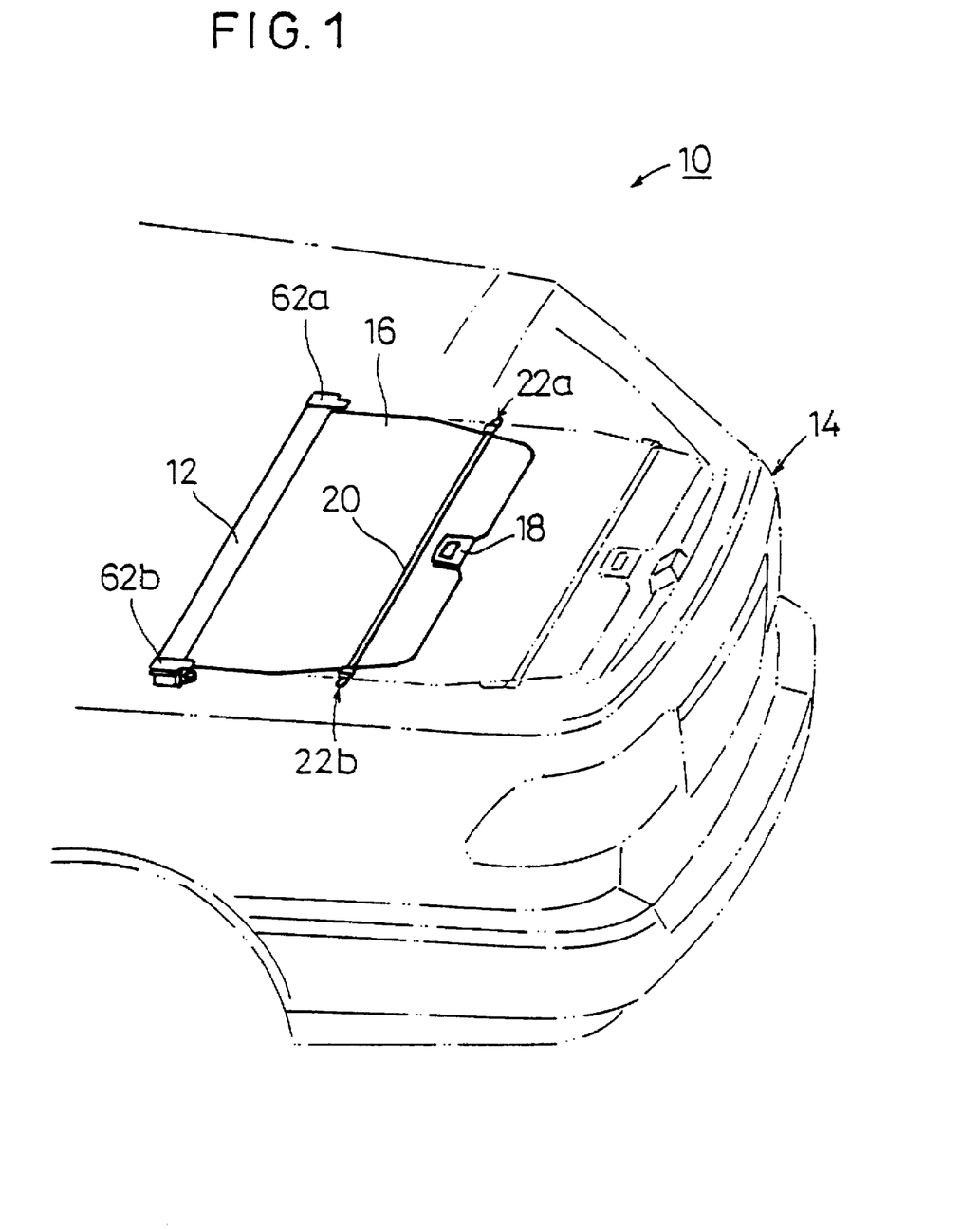
FIG. 1 is a perspective view of a tonneau cover device according to the present invention which is incorporated in the cargo room of a motor vehicle.

As shown in FIG. 1, a tonneau cover device 10 according to the present invention comprises an elongate casing 12 mounted in a motor vehicle such as a station wagon and extending transversely of the motor vehicle substantially parallel to and behind rear passenger's seats, a cover 16 which can be pulled from the casing 12 to a rear end position in a cargo room near a tailgate 14 of the motor vehicle in a direction substantially perpendicular to the casing 12 and which has a substantial portion that can be wound and stored in the casing 12 under the bias of a spring (not shown) disposed in the casing 12, and a cylindrical member (not shown) rotatably disposed in the casing 12 and rotatable about its own axis by the spring to wind the cover 16 therearound.

Figure 4:
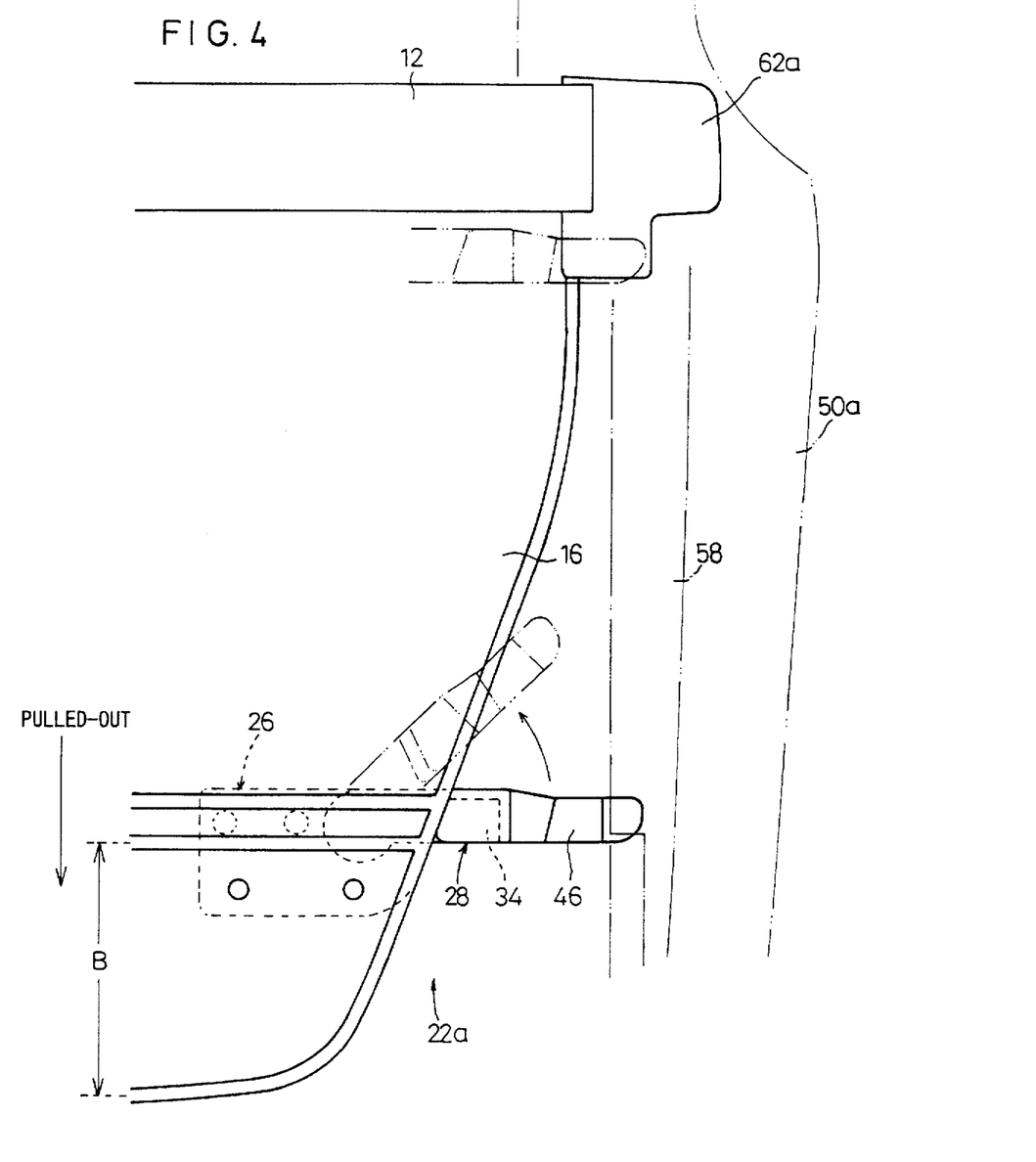
FIG. 4 is a fragmentary plan view, showing how the hook mechanism operates.

The tonneau cover device 10 also has a handle 18, which is to be gripped by the user of the tonneau cover device 10, disposed on a rear end of the cover 16, and a shaft 20 supported on the cover 16 and extending transversely across the cover 16, i.e., perpendicularly to the direction, indicated by the arrow in FIG. 4, in which the cover 16 can be pulled out of the casing 12. Two hook mechanisms 22a, 22b are mounted on respective lateral ends of the cover 16 at the respective opposite ends of the shaft 20 for locking the cover 16 in place in the cargo room. Since the hook mechanisms 22a, 22b are symmetrical in shape, only one of the hook mechanisms 22a will be described below.

Figure 2:
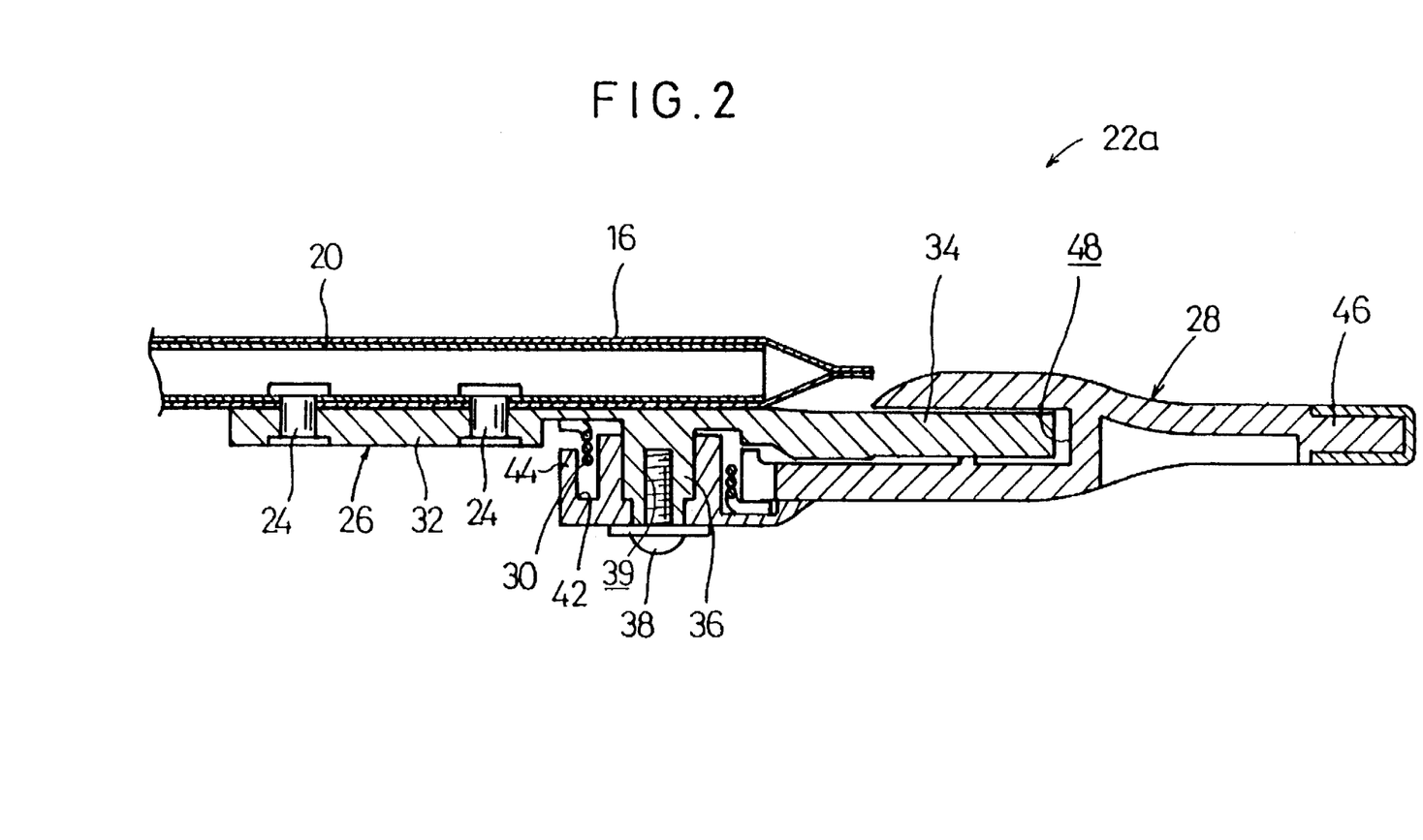
FIG. 2 is an enlarged cross-sectional view of a hook mechanism of the tonneau cover device shown in FIG. 1.
Figure 3:
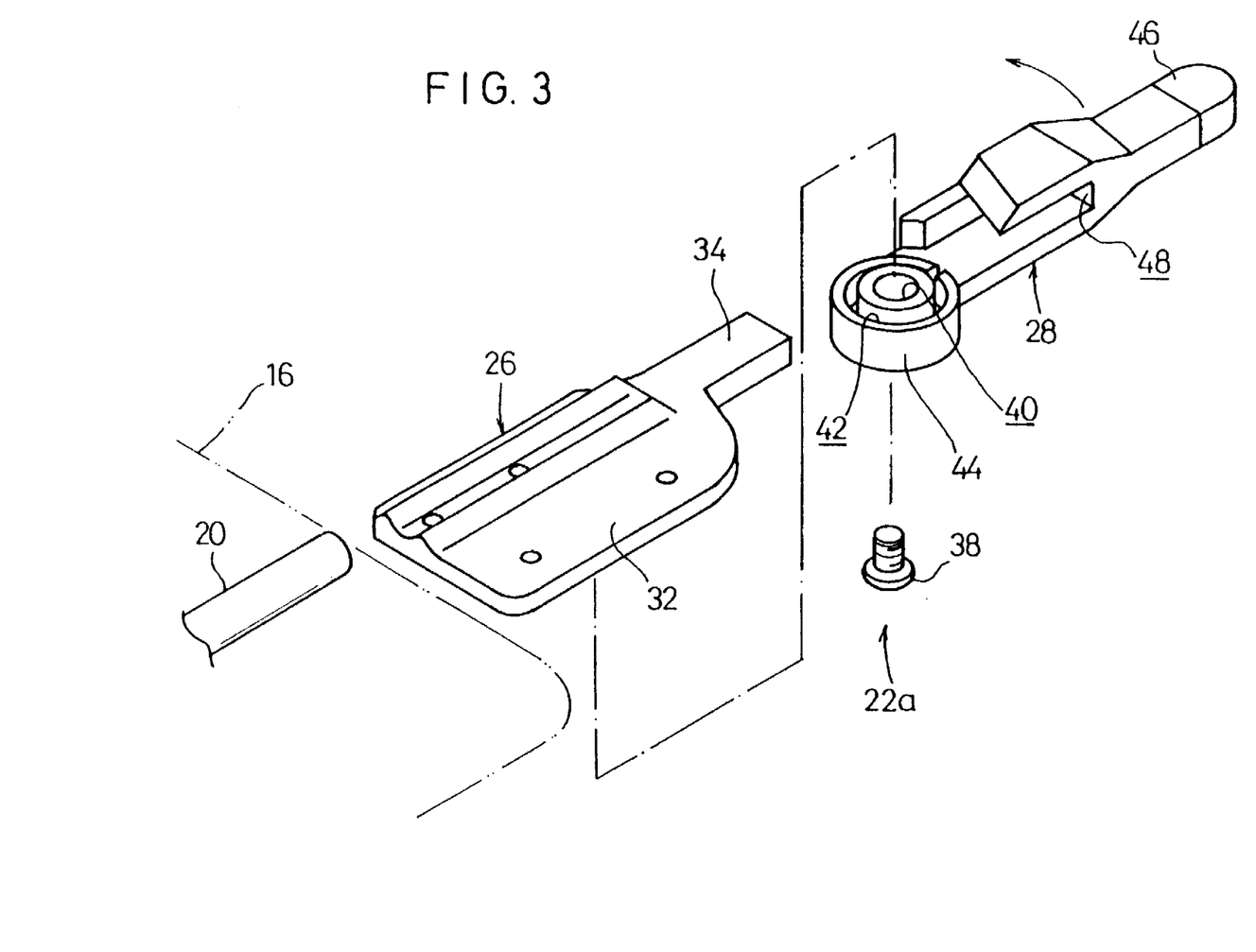
FIG. 3 is an exploded perspective view of the hook mechanism.

As shown in FIGS. 2 and 3, the hook mechanism 22a comprises a fixed hook member 26 fastened to the shaft 20 by screws 24, a movable hook member 28 angularly movably mounted on the fixed hook member 26 for angular movement through a predetermined angle in the direction indicated by the arrow (see FIG. 3), and a torsion coil spring 30 (see FIG. 2) acting between the fixed and movable hook members 26, 28 for normally biasing the movable hook member 28 to rotate in a direction opposite to the direction indicated by the arrow.

The fixed hook member 26 comprises a flat web 32 fastened to the shaft 20 supported on the cover 16, a first arm 34 integral with the flat web 32 and projecting outwardly laterally from the cover 16, and a shank 36 projecting downwardly from the flat web 32. The shank 36 has an internally threaded hole 39 defined therein into which a screw 38 is threaded.

The movable hook member 28 comprises a cylindrical member 44 having a through hole 40 defined vertically therein and receiving the shank 36 therein and an annular groove 42 defined therein around the through hole 40 and receiving the spring 30, a second arm 46 integral with and extending away from the cylindrical member 44 for angular movement about the cylindrical member 44 through a predetermined angle, and a groove 48 defined between the cylindrical member 44 and the second arm 46 and receiving the first arm 34. The movable hook member 28 is normally held under the bias of the spring 30 to keep the first arm 34 inserted in the groove 48, i.e., to project itself outwardly substantially perpendicularly to the direction in which the cover 16 can be pulled out of the casing 12, as indicated by the solid lines in FIG. 4.

The hook mechanisms 22a, 22b can be engaged by respective retainer mechanisms 50a, 50b (see FIG. 5) which are detachably mounted on opposite side walls of the cargo room by fasteners (not shown), the retainer mechanisms 50a, 50b extending substantially parallel to the direction in which the cover 16 can be pulled out of the casing 12. Since the retainer mechanisms 50a, 50b are symmetrically in shape with respect to the longitudinal axis of the cover 16, only one of the retainer mechanisms 50a will be described below. The hook mechanisms 22a, 22b and the retainer mechanisms 50a, 50b jointly serve as lock means.

Figure 5:
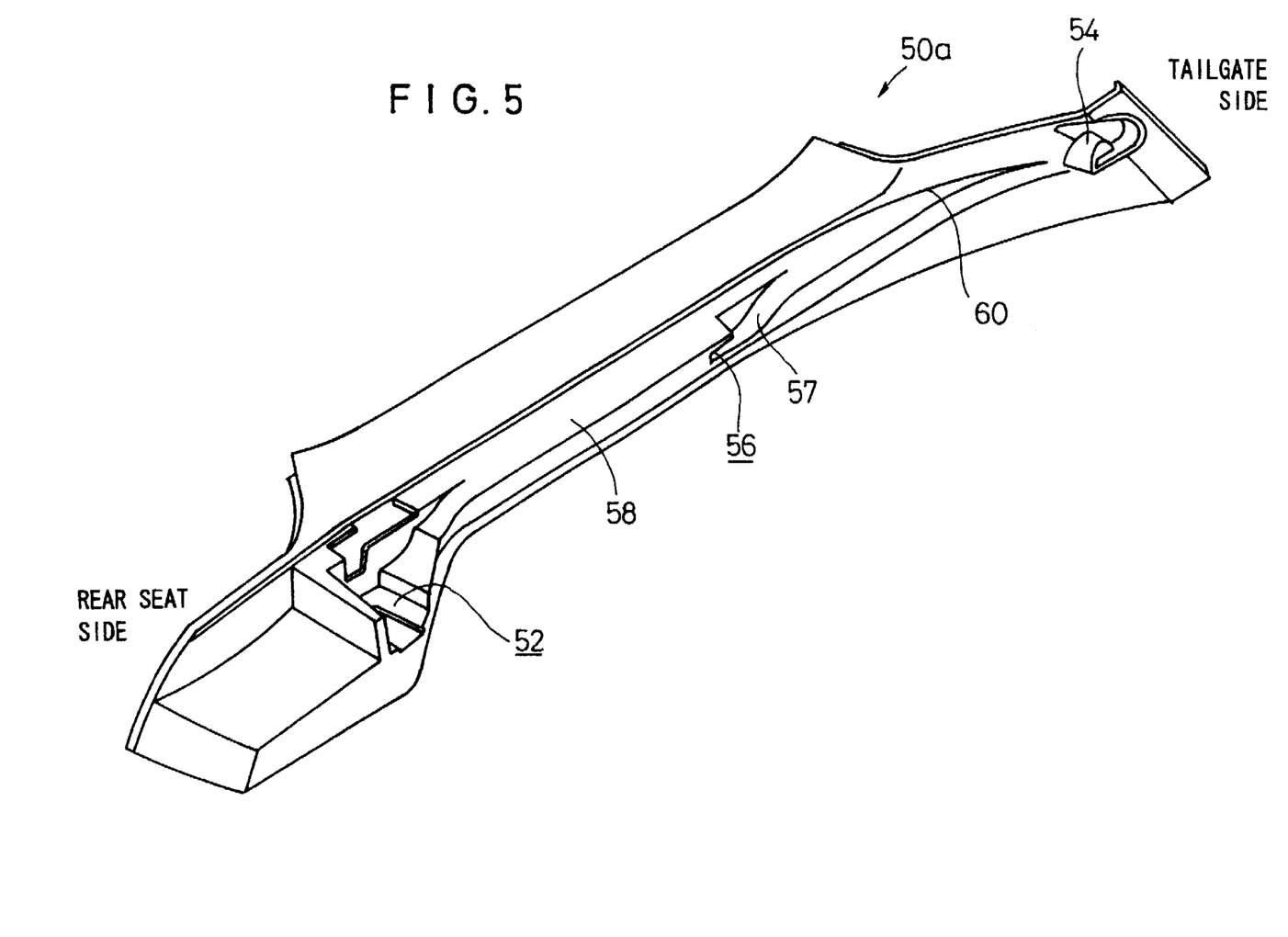
FIG. 5 is a perspective view of a retainer mechanism for holding the hook mechanism.

As shown in FIG. 5, the retainer mechanism 50a has a holder cavity 52 positioned on a front end portion near the casing 12 for holding an end of the casing 12, a hook-shaped tooth 54 positioned on a rear end portion near the tailgate 14 for engaging the first arm 34 of the fixed hook member 26, and a recess 56 defined between the holder cavity 52 and the hook-shaped tooth 54 for receiving the second arm 46 of the movable hook member 28. The retainer mechanism 50a has a slanted surface 57 extending obliquely downwardly in a direction from the hook-shaped tooth 54 to the holder cavity 52, the slanted surface 57 smoothly blending into a bottom surface of the recess 56. The slanted surface 57 serves to guide the second arm 46 therealong smoothly into the recess 56.

The retainer mechanism 56 also has a guide groove 58 extending between the holder cavity 52 and the hook-shaped tooth 54, substantially parallel to the direction in which the cover 16 can be pulled out of the casing 12, for guiding the first arm 34 and the second arm 46. The guide groove 58 is partly defined by a curved side wall 60 near the hook-shaped tooth 54. The curved side wall 60 progressively reduces the width of the guide groove 58 toward the hook-shaped tooth 54.

Figure 6:
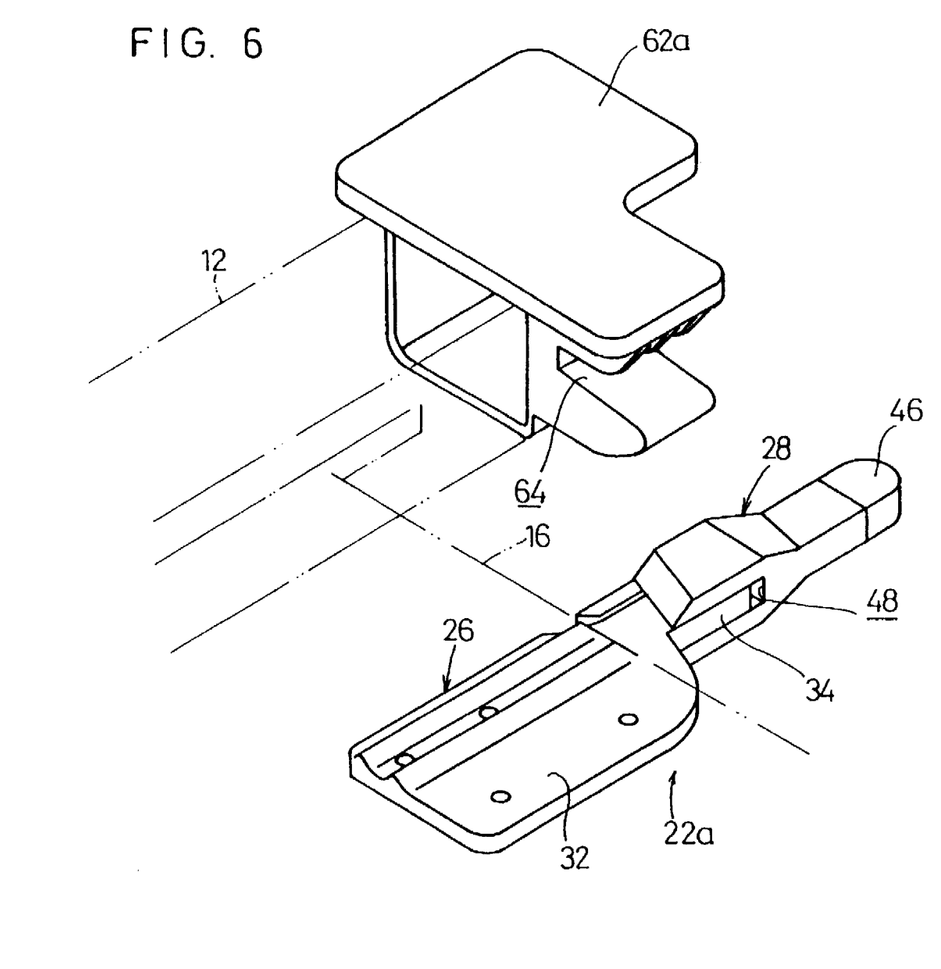
FIG. 6 is an exploded perspective view of a holder and a movable hook member of the hook mechanism.

As shown in FIG. 1, holders 62a, 62b, each for holding the second arm 46 of the movable hook member 28 (see also FIG. 6), are mounted on the respective opposite ends of the casing 12. Each of the holders 62a, 62b has a holder slot 64 of tapered cross section defined therein for holding the second arm 46 therein.

Operation and advantages of the tonneau cover device 10 will be described below.

It is assumed that the user wishes to pull the cover 16 from the casing 12 and lock the cover 16 in a certain position.

The user, who is standing behind the tailgate 14 of the motor vehicle, grips the handle 18 on the cover 16 by hand, and pulls the cover 16 from the casing 12 toward himself. At this time, the second arms 46 of the movable hook members 28 of the hook mechanisms 22a, 22b project substantially perpendicularly from the respective lateral edges of the cover 16. While the cover 16 is being progressively pulled from the casing 12 by the user, the second arms 46 slide in and along the guide grooves 58 of the respective retainer mechanisms 50a, 50b (see FIG. 4).

Then, the user selects a position where the cover 16 is to be locked in place and locks the cover 16 in the selected position. Specifically, after the user has pulled the second arms 46 toward the hook-shaped teeth 54 along the guide grooves 58, the user allows the second arms 46 to descend down the slanted surfaces 57 into the recesses 56 under the bias of the spring in the casing 12. The cover 16 is now locked in a substantially intermediate position in the cargo room.

To unlock the cover 16 from the substantially intermediate position in the cargo room, the user pulls the handle 18 toward himself to move the second arms 46 from the recesses 56 up the slanted surfaces 57 toward the hook-shaped teeth 54. The cover 16 is now unlocked in the substantially intermediate position in the cargo room and can further pulled from the casing 12.

If the user wants to cover the cargo room in its entirety with the cover 16, then the user grips the handle 18 and pulls the cover 16 up to a rear end position near the tailgate 14 until the first arms 34 of the fixed hook members 26 engage the respective hook-shaped teeth 54.

Figure 7:
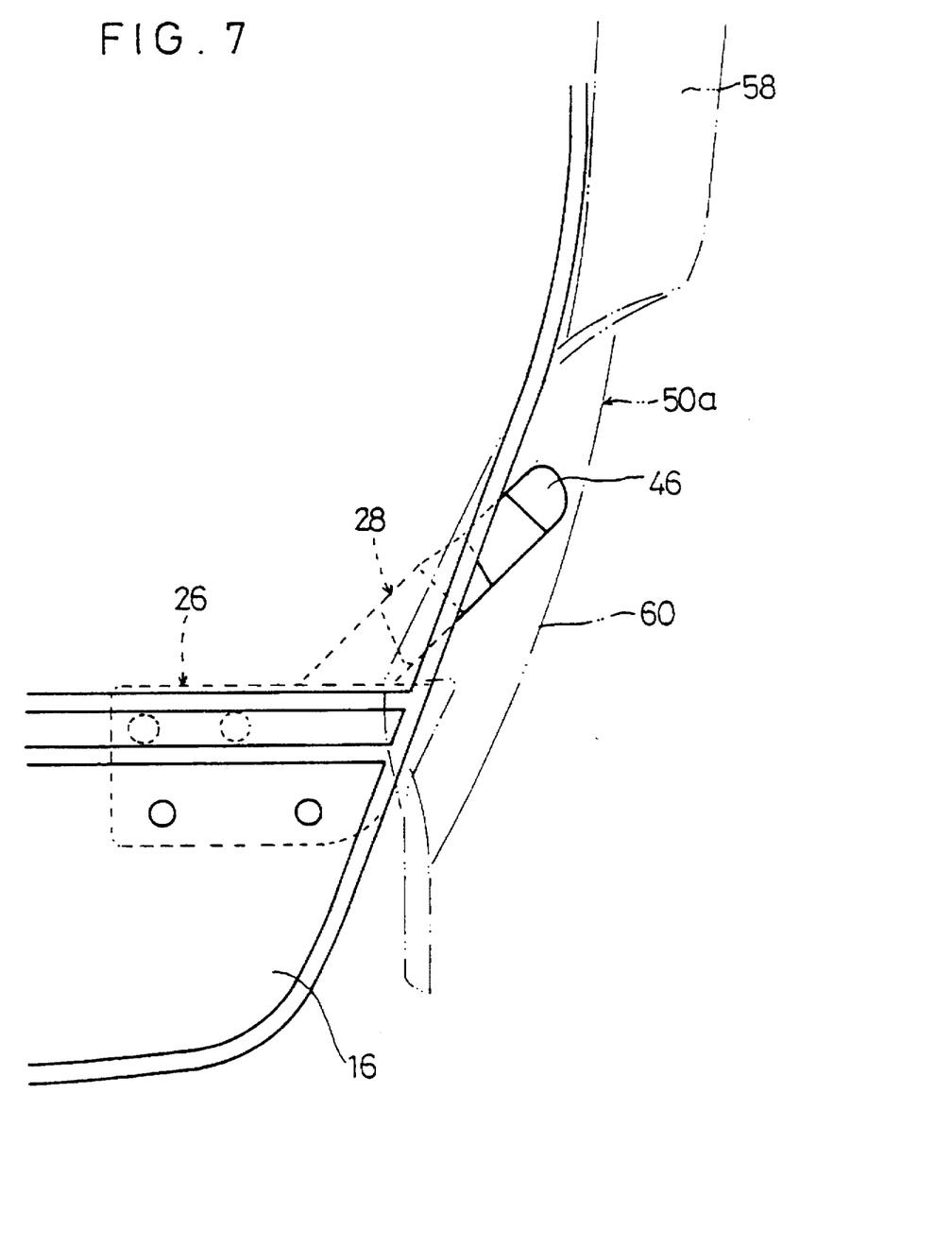
FIG. 7 is a fragmentary plan view, showing how the hook mechanism operates.

More specifically, as the first and second arms 34, 46 are guided along the guide grooves 58 toward the hook-shaped teeth 54, the second arms 46 slidably abut the curved side walls 60 and are angularly moved thereby about the respective shanks 36 toward the casing 12 against the bias of the springs 30 as shown in FIG. 7. Therefore, the first arms 34 inserted in the respective grooves 48 in the movable hook members 28 are exposed and then engaged by the hook-shaped teeth 54, respectively.

To release the first arms 34 from the hook-shaped teeth 54, the user further pulls the handle 18 to himself to displace the first arms 34 off the hook-shaped teeth 54.

Figure 8:
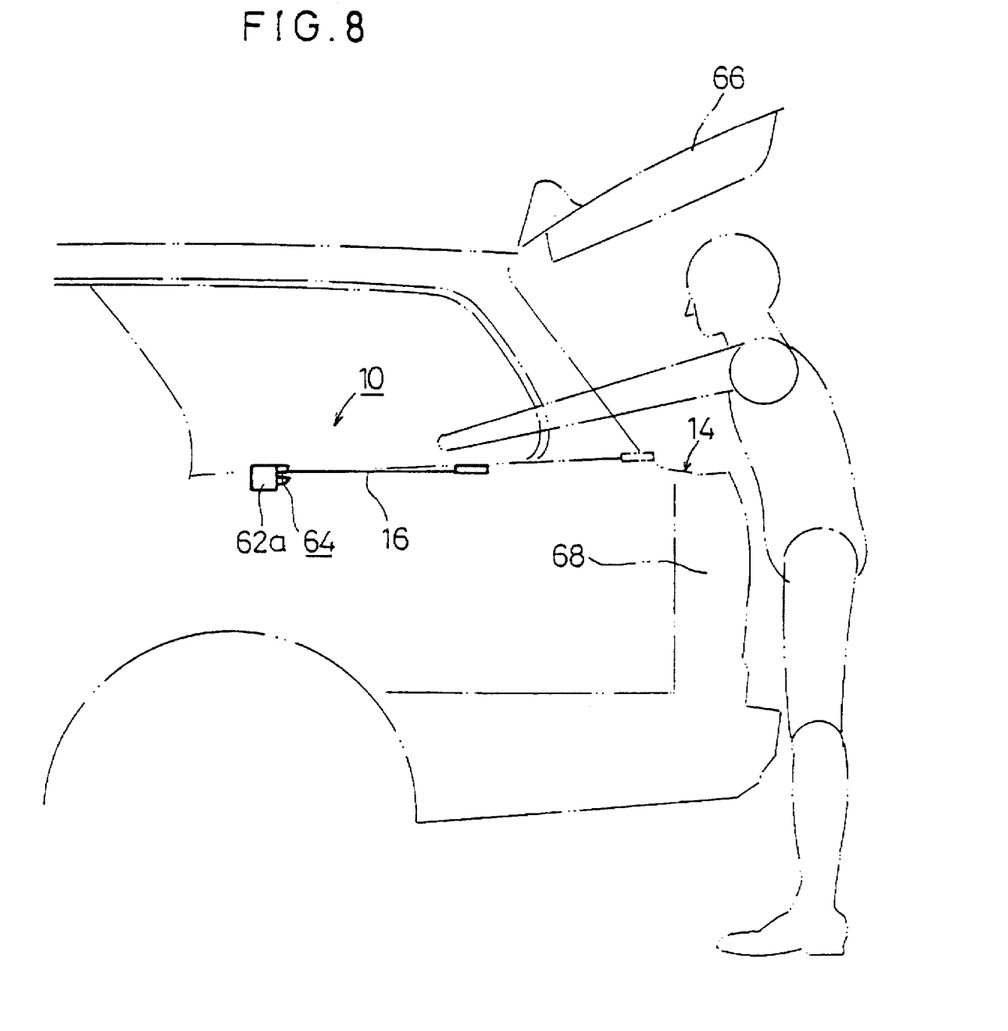
FIG. 8 is a schematic side elevational view showing the manner in which a cover of the tonneau cover device is operated by the user who is standing behind the tailgate of the motor vehicle.

As shown in FIG. 8, if the tonneau cover device 10 is installed in a motor vehicle where the tailgate 14 comprises a rear hatch glass panel 66 and a rear gate 68 which independently be opened and closed, then it is possible for the user to open the rear hatch glass panel 66 and pulls out the cover 16 from the intermediate position or store the cover 16 into the casing 12 easily without bending the user's upper body into the cargo room.

In the illustrated embodiment, since each of the hook mechanisms 22a, 22b mounted on the cover 16 comprises the fixed hook member 26 and the movable hook member 28 only, the tonneau cover device 10 is relatively simple in structure, is made up of a relatively small number of parts, and can be manufactured inexpensively.

Furthermore, the distance B (see FIG. 4) from the shaft 20 where the hook mechanisms 22a, 22b are mounted on the cover 16 to the rear end of the cover 16 is smaller than the distance A (see FIG. 10) on the conventional cover. When the cover 16 is housed in the casing 12, the hook mechanisms 22a, 22b are held by the holders 62a, 62b, respectively. Therefore, the rear end portion of the cover 16 which cannot be stored in the casing 12 is prevented from wobbling and producing noise.

In the illustrated embodiment, only one recess 56 is defined between the holder cavity 52 and the hook-shaped tooth 54 of each of the retainer mechanisms 50a, 50b. However, a plurality of such recesses 56 may be defined between the holder cavity 52 and the hook-shaped tooth 54 of each of the retainer mechanisms 50a, 50b for allowing the cover 16 to be locked selectively in a plurality of positions which correspond to those recesses 54.

Although a certain preferred embodiment of the present invention has been shown and described in detail, it should be understood that various changes and modifications may be made therein without departing from the scope of the appended claims.

What is claimed is:

1. A tonneau cover device for use in a motor vehicle having a tailgate, comprising:

a casing;

a cover normally stored in said casing and drawable from said casing toward the tailgate;

lock means for locking said cover selectively in a rear end position near the tailgate and an intermediate position between said casing and the tailgate, wherein said lock means comprises a pair of hook mechanisms mounted on said cover, each of said hook mechanisms comprising a fixed hook member fixedly mounted on said cover, and a movable hook member movably mounted on said fixed hook member; and a pair of retainer mechanisms, each of said retainer mechanisms comprising first engaging means for engaging and retaining said fixed hook member to secure said cover in one position, and second engaging means for engaging and retaining said movable hook member to secure said cover in another position.

2. A tonneau cover device according to claim 1, wherein said movable hook member is rotatably mounted on said fixed hook member, wherein rotation of said movable hook member exposes said fixed hook member to enable engagement with said first engaging means.

3. A tonneau cover device according to claim 2, wherein each of said hook mechanisms further comprises a spring acting between the fixed and movable hook members for normally biasing said movable hook member to rotate in a predetermined direction with respect to said fixed hook member.

4. A tonneau cover device according to claim 1, wherein said fixed hook member has a first arm projecting outwardly from said cover for engagement by said first engaging means.

5. A tonneau cover device according to claim 1, wherein said movable hook member is mounted on said fixed hook member for angular movement through a predetermined angle, and has a second arm slidably engaged by said retainer mechanisms and a groove receiving said fixed hook member therein.

6. A tonneau cover device according to claim 1, wherein said first engaging means comprises a tooth disposed on a rear end portion of each of said retainer mechanisms near the tailgate for engaging the fixed hook member, and said second engaging means comprises a recess defined between a front end portion of each of said retainer mechanisms near the casing and said tooth for receiving the movable hook member, each of said retainer mechanisms further comprising a guide groove extending substantially parallel to the direction in which the cover can be drawn from the casing, said guide groove being partly defined by a curved side wall which progressively reduces the width of said guide groove toward said tooth, said movable hook member being angularly movable with respect to said fixed hook member by sliding engagement with said curved side wall.

7. A tonneau cover device according to claim 1, further comprising a pair of holders mounted on the respective opposite ends of the casing, each of said holders having a holder slot defied therein for holding said movable hook member therein.

8. A tonneau cover device according to claim 6, wherein said recess is disposed in at least one position along said guide groove.

9. A tonneau cover device according to claim 6, wherein each of said retainer mechanisms further comprises a slanted surface extending in a direction away from said tooth into said recess for guiding said movable hook member into said recess.

10. A tonneau cover device according to claim 1, for use in a motor vehicle which has a tailgate comprising a rear hatch glass panel and rear gate which can independently be opened and closed.

* * * * *